US008424857B2

(12) United States Patent
Green et al.

(10) Patent No.: US 8,424,857 B2
(45) Date of Patent: Apr. 23, 2013

(54) FIXTURE FOR SUPPORTING A WORKPIECE

(75) Inventors: Richard Green, Bristol (GB); Michael Annear, Bristol (GB)

(73) Assignee: Rolls-Royce PLC, London (GB)

( * ) Notice: Subject to any disclaimer, the term of this patent is extended or adjusted under 35 U.S.C. 154(b) by 287 days.

(21) Appl. No.: 12/876,410

(22) Filed: Sep. 7, 2010

(65) Prior Publication Data

US 2011/0084431 A1   Apr. 14, 2011

(30) Foreign Application Priority Data

Oct. 8, 2009   (GB) .................................. 0917579.5

(51) Int. Cl.
  *B23Q 3/08* (2006.01)
  *B25B 11/00* (2006.01)
(52) U.S. Cl.
  USPC ............................ 269/22; 279/4.03; 279/2.08
(58) Field of Classification Search ..................... 269/22, 269/275, 289 R, 302.1, 309, 310, 900; 279/2.08, 279/4.01, 4.03, 4.05; 92/102, 103 M, 103 R, 92/93, 96, 98 R
  See application file for complete search history.

(56) References Cited

U.S. PATENT DOCUMENTS

| | | | | |
|---|---|---|---|---|
| 2,534,527 A * | 12/1950 | Myers | ........................... | 279/4.03 |
| 2,560,902 A * | 7/1951 | Smith | .............................. | 269/22 |
| 2,852,463 A * | 9/1958 | Gutzmer | ....................... | 204/242 |
| 3,025,072 A * | 3/1962 | Cahill | ........................... | 279/4.05 |
| 3,323,788 A * | 6/1967 | Roudier | ........................... | 269/22 |
| 3,542,354 A * | 11/1970 | Fitzpatrick | ..................... | 269/22 |
| 3,608,809 A | 9/1971 | Cushman | | |
| 3,663,027 A * | 5/1972 | Klipping | ...................... | 279/4.03 |
| 3,808,968 A * | 5/1974 | Notin | ............................. | 100/264 |
| 3,827,421 A * | 8/1974 | Schumacher et al. | ..... | 125/13.02 |
| 4,014,311 A * | 3/1977 | Steere, Jr. | ................... | 125/13.02 |
| 4,151,826 A * | 5/1979 | Otte | ........................... | 125/13.02 |
| 4,498,449 A * | 2/1985 | Kachajian et al. | .............. | 125/15 |
| 4,643,408 A * | 2/1987 | Stoll | ............................... | 269/22 |
| 4,687,189 A * | 8/1987 | Stoll et al. | ....................... | 269/22 |
| 4,813,657 A * | 3/1989 | Todd | .............................. | 269/22 |

(Continued)

FOREIGN PATENT DOCUMENTS

DE   3315215 A  * 10/1984
DE   35 02 575 A1   8/1985

(Continued)

OTHER PUBLICATIONS

Search Report issued in European Application No. EP 10 17 5383 dated Jan. 20, 2011.

(Continued)

*Primary Examiner* — Lee D Wilson
*Assistant Examiner* — Tyrone V Hall, Jr.
(74) *Attorney, Agent, or Firm* — Oliff & Berridge, PLC

(57) ABSTRACT

A fixture (10) for supporting a workpiece (18) during a machining operation. The fixture comprising a base (12) provided with a channel (14) for receiving part (16) of the workpiece (18), the channel having a first wall (20) facing an opposing second wall (22). An inflatable diaphragm (24) is located on the first wall (20), and configured to engage with an engagement surface (36) on the workpiece and bias the workpiece against the second wall. The diaphragm comprises a deformable portion (26) spaced apart from the first wall of the channel, the deformable portion having ends (28,30) which provide a seal with the first wall to define a chamber (32) enclosed by the first wall and diaphragm.

12 Claims, 4 Drawing Sheets

U.S. PATENT DOCUMENTS

| | | | | |
|---|---|---|---|---|
| 4,934,672 | A | * | 6/1990 | Craft .............................. 269/22 |
| 4,989,909 | A | * | 2/1991 | Bouligny et al. .......... 294/119.3 |
| 6,182,977 | B1 | * | 2/2001 | Weller ........................ 279/2.08 |
| 6,302,364 | B1 | * | 10/2001 | Chiueh ...................... 248/311.2 |
| 2008/0217872 | A1 | * | 9/2008 | Hofmann ...................... 279/152 |

FOREIGN PATENT DOCUMENTS

| | | | |
|---|---|---|---|
| DE | 35 40 235 | A1 | 5/1987 |
| DE | 36 10 287 | A1 | 10/1987 |
| DE | 3610287 | A1 * | 10/1987 |
| GB | 2 196 275 | A | 4/1988 |
| GB | 2196275 | A * | 4/1988 |
| JP | A-2004-058246 | | 2/2004 |
| WO | WO 9015703 | A1 * | 12/1990 |

OTHER PUBLICATIONS

Search Report in British Patent Application No. GB0917579.5, dated Jan. 15, 2010.

* cited by examiner

FIXTURE FOR SUPPORTING A WORKPIECE

FIELD OF INVENTION

The present invention relates to a fixture for supporting a workpiece.

BACKGROUND OF THE INVENTION

It is a common requirement to hold a component (or "workpiece") in position on a fixture associated with an automated machine tool (for example a Computer Numerically Controlled Milling Machine) while it is machined. For annular components, such as casings, it is known to hold the component within guides on a fixture on a location diameter, with a minimal clearance between the guides and the circumference of the casing to lead the component to the correct position on the fixture. The casing is then clamped to the fixture. If necessary, shims may be used to centre the component in the correct position on the fixture. The disadvantage of such equipment and method is that any play or misalignment between the component and fixture may result in machining tools removing material from incorrect locations or drilling holes to incorrect depths. Play and misalignment may also result in incorrect measurements when measured using an automated measuring device (for example a Coordinate Measuring Machine), perhaps leading to the component being incorrectly rejected. If an annular component is clamped incorrectly, it may become distorted (for example eccentric), resulting in features being machined to incorrect shapes.

Hence a means for supporting a workpiece during a machining operation which locates the workpiece in a correct location without distortion is highly desirable.

SUMMARY OF THE INVENTION

According to a first aspect of the invention there is provided a fixture for supporting a workpiece during a machining operation, the fixture comprising a base provided with a channel for receiving part of the workpiece, the channel having a first wall facing an opposing second wall, wherein an inflatable diaphragm is located on the first wall, and configured to engage with an engagement surface on the workpiece and bias the workpiece against the second wall, and the diaphragm comprises a deformable portion spaced apart from the first wall of the channel, the deformable portion having ends which provide a seal with the first wall to define a chamber enclosed by the first wall and diaphragm.

According to a second aspect of the invention there is provided a method of locating a workpiece for a machining operation, comprising the steps of:

a) entering a region of the workpiece in a channel provided in a support base, the channel having a first wall facing an opposing second wall;

b) inflating a diaphragm located on one wall of the channel such that the workpiece is biased against the opposing channel wall;

wherein the diaphragm comprises a deformable portion spaced apart from the first wall of the channel, the deformable portion having ends which provide a seal with the first wall to define a chamber enclosed by the first wall and diaphragm.

With the diaphragm engaged with the engagement surface of the workpiece, and the workpiece biased against the second wall, the workpiece is correctly located on the fixture and correctly aligned relative to the fixture. This being achieved, a correct relative position of the workpiece relative to machining tools and/or measuring equipment associated with the fixture is achieved.

BRIEF DESCRIPTION OF THE DRAWINGS

Embodiments of the invention will now be described with reference to the accompanying drawings, in which.

DETAILED DESCRIPTION OF EMBODIMENTS

Figure 1:
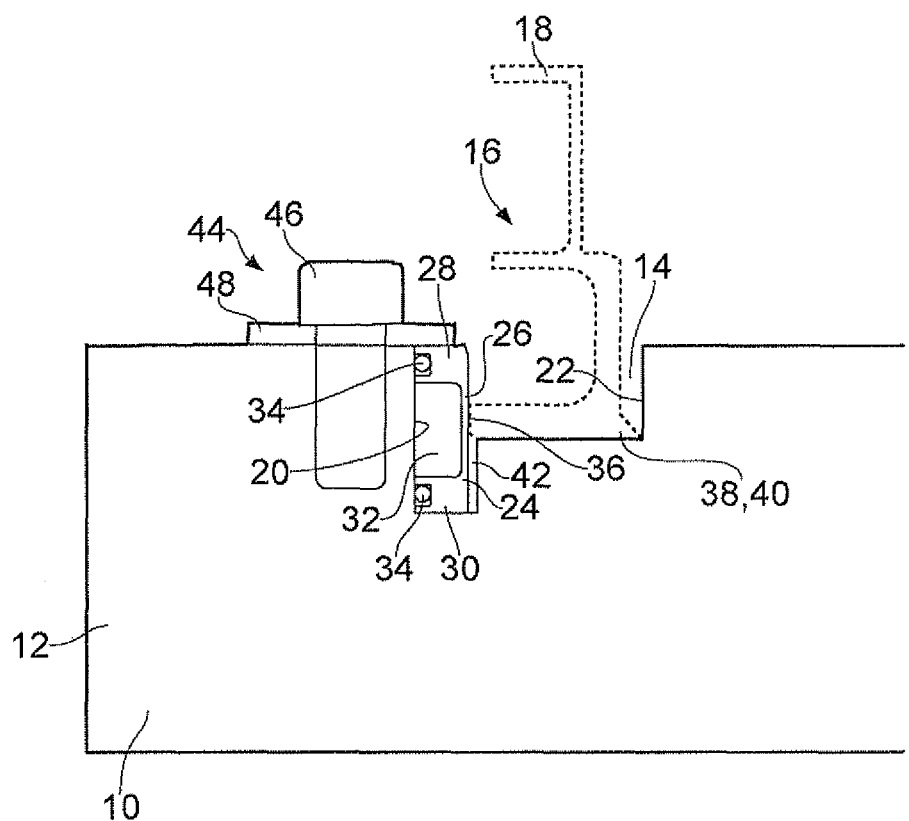
FIG. 1 shows a cross sectional view of a fixture according to the present invention, with a workpiece (shown in dotted line) installed in position.
Figure 2:
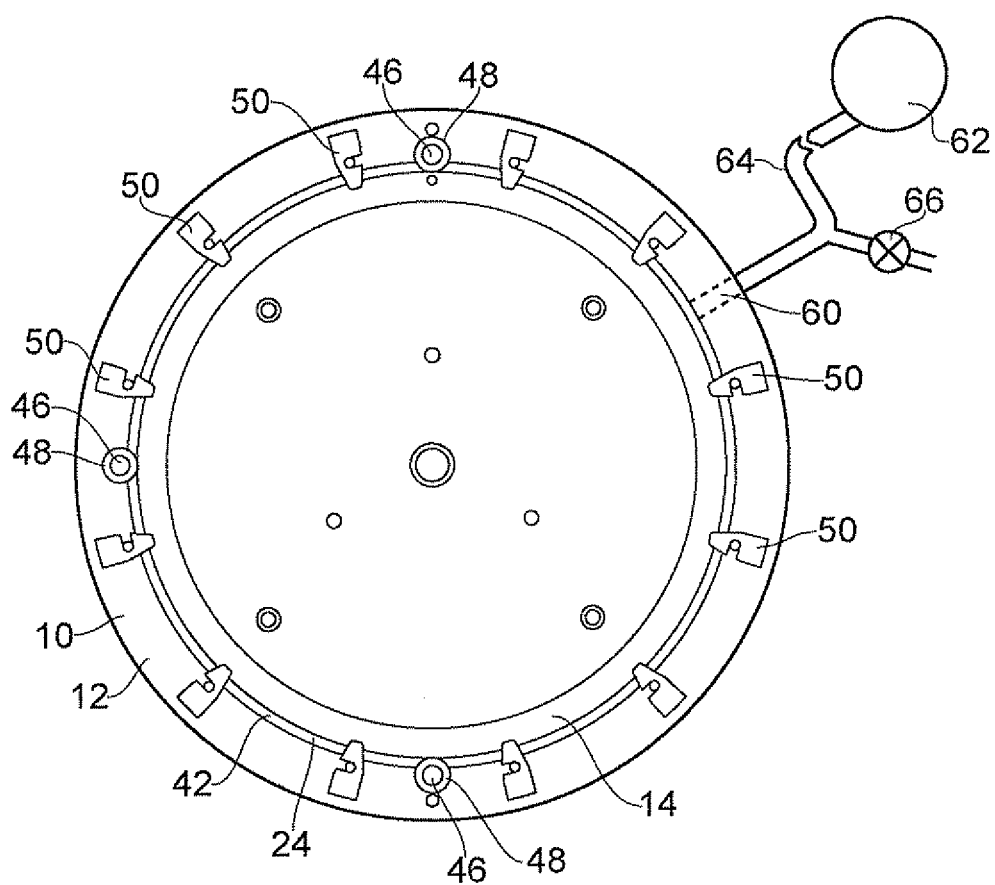
FIG. 2 is a plan view of one embodiment of a fixture according to the present invention.
Figure 3:
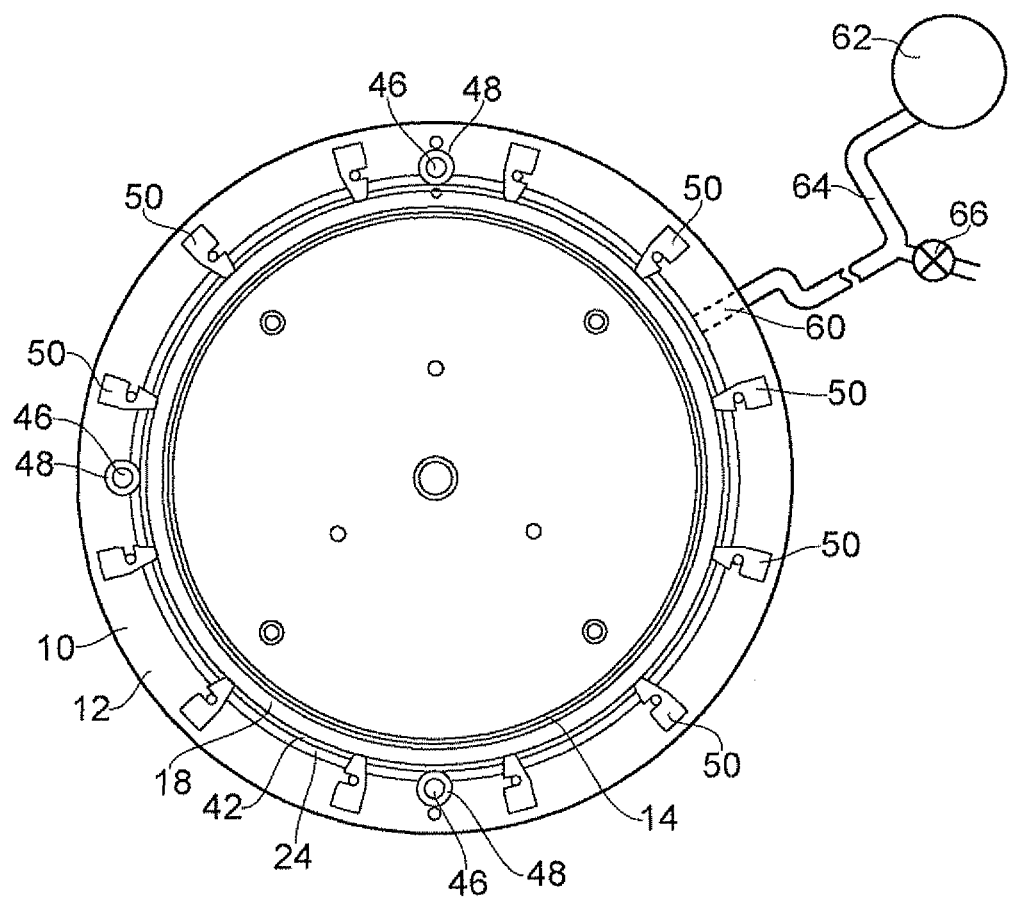
FIG. 3 is the same view as shown in claim 2, with a workpiece installed in position.
Figure 4:
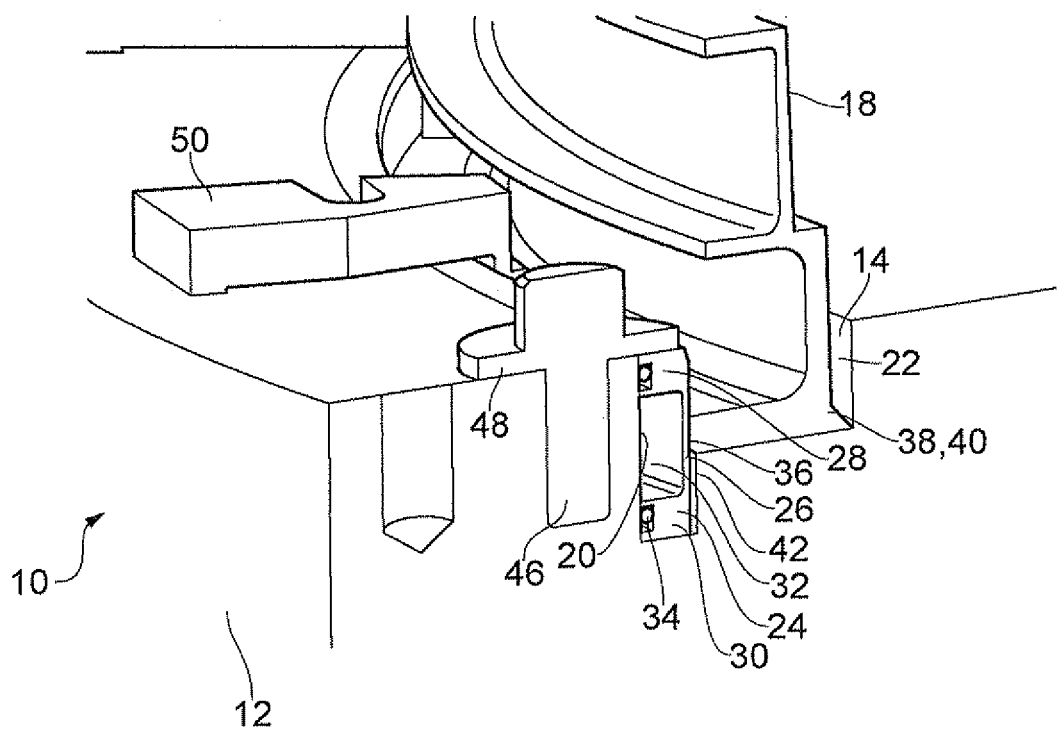
FIG. 4 is a perspective view of the fixture with a workpiece installed in position.

Shown in FIG. 1 is a fixture 10 according to the present invention. The fixture 10 comprises a base 12 provided with a channel 14 for receiving part, or region, 16 of a workpiece 18 (shown in a dotted line). The channel 14 has a first wall 20 facing an opposing second wall 22. An inflatable diaphragm 24 is located on the first wall 20. As shown in the plan view of FIGS. 2 and 3, the channel 14 is substantially annular. FIG. 2 shows the fixture 10, and FIG. 3 shows the fixture 12 with the workpiece 18 installed. For added clarity, a perspective view is shown in FIG. 4.

The diaphragm 24 comprises a deformable portion 26 spaced apart from the first wall 20 of the channel 14. The deformable portion 26 has ends 28,30 which provide a seal with the first wall 20 to define a chamber 32 enclosed by the first wall 20 and diaphragm 24. The ends of the diaphragm 24 are substantially thicker than the deformable portion 26. A sealing member 34 is provided between at least one of the ends 28,30 of the diaphragm 24 and the first wall 20. The sealing members 34 may be provided as "O" rings.

In the embodiment shown, the workpiece 18 has an engagement surface 36 which, when installed in the channel 14, will face the diaphragm 24. In the embodiment shown the workpiece 18 also has a location region 38, in this example in the form of a shoulder 40, which extends from the main body of the workpiece 18 on the opposite side to the engagement surface 36. It will be appreciated however that the workpiece 18 does not form part of the invention, and that the embodiment of the invention shown may be used with workpieces having geometries different to that shown in the figures. Hence the terms "engagement surface", "location region" and "shoulder" encompass features of different form to that shown in the figures.

The diaphragm 24 is seated in a groove 42 provided in the base of the channel 14. The diaphragm 24, channel 14 and groove 42 are sized such that deformable portion 26 is aligned with the engagement surface 36 of the workpiece 18. In the example shown, substantially the centre of the deformable portion 26 is aligned with the engagement surface 36.

Means 44 are provided to trap the diaphragm 24 in the channel 14. In the example shown, the means comprise a bolt 46 which tightens into the base 12 and holds a washer 48. The washer 48 extends of the edge of the channel 14 to overlap the diaphragm 24, thereby trapping the diaphragm 24 in the channel 14. However, any suitable means for trapping the diaphragm 24 may be used.

As shown in FIGS. 2, 3 and 4, the fixture 10 further comprises a clamping means 50 for clamping the workpiece 18 to the fixture base 12. The clamping means 50 extends over the edge of the channel 14 and down into the channel 14 towards the channel base. With the workpiece 18 in place, the clamping means 50 engages with the workpiece 18, clamping it onto the channel base.

As shown in FIGS. 2 and 3, a supply passage 60 is provided in the first wall 20 for delivery of fluid to the chamber 32 from a fluid source. The supply passage 60 is coupled to a source of pressurised fluid 62 via a tube 64. A valve 66 is provided on the tube 64 for the evacuation of fluid from the chamber 32, and for the control of fluid pressure in the supply passage 32.

In operation the workpiece 18 is entered in the channel 14. Pressurised fluid or gas is then supplied from the pressure source 62 via the tube 64 to the chamber 32 to inflate the diaphragm 24. The diaphragm 24 engages with the workpiece engagement surface 36, and biases the workpiece 18 against the second wall 22 such that the location region 38 of the workpiece 18 is located substantially uniformly on the second wall 22. That is to say, the diaphragm 24 forces the workpiece 18 towards the second wall 22 such that contact is maintained between the location region 38 and the second wall 22 along the whole length (or circumference) of the workpiece 18. With the workpiece 18 located on the second wall, and thus in the desired position for machining, the clamping means 50 are engaged with the workpiece 18 to clamp the workpiece 18 to the fixture 12. The valve 66 is then opened to evacuate the chamber 32, thus deflating the diaphragm 24. The workpiece is thus centred in the channel 14 and located in the correct position on the fixture 10 for subsequent machining operations.

The diaphragm may be manufactured from a high elasticity metal. In one embodiment, the diaphragm 24 is made from a metal or metal alloy, for example stainless steel. In practice it has been found that with a diaphragm 24 made from such materials, the dimensional tolerances are such that a significant amount of force may be required to push the diaphragm into position in the channel 14 and groove 42. In order for the deformable portion 26 to be suitably deformable, it may have a very thin wall thickness, which may buckle under the force exerted on the diaphragm during assembly. Thus diaphragm 24 is fitted to the fixture with the deformable portion 26 having an oversize wall thickness. The deformable portion 26 is then machined to the desired wall thickness. The thicker ends 28,30 of the diaphragm 24 ensure the diaphragm 24 is rigid enough to be installed in the groove 42, and rigid enough to support the deformable portion 26 during and after machining.

In one embodiment, the ratio of thickness to height of the deformable portion 23 is 1:23. For example for a 15 mm span height, the deformable portion is 0.65 mm thick. A diaphragm of these dimensions made from steel may be inflated up to 80 psi with hydraulic fluid or compressed air, causing a change in diaphragm diameter of 125 µm within a tolerance of 5 µm. Such a variance is within limits of tolerance of a co-ordinate measuring machine, and so a fixture according to the present invention will not increase errors in measurement of a workpiece mounted in such a fixture.

The apparatus and method according to the present invention provides the advantage that the process of constraining a component to be machined is made reliably repeatable for the same and different components since the component is biased towards and located on the same region of the fixture (ie the second wall). This reduces non-conformance due to misalignments between the tooling and components, and saves considerable time in setting components up for machining.

The advantage of making the diaphragm from steel rather than a rubber/plastic type material because steel has a high elasticity modulus. Therefore the radial deflection of the diaphragm for a given fluid or air supply pressure is significantly more repeatable.

In the example show in FIGS. 1 to 4, the location region 38 is shown as a shoulder 40, and thus a gap is maintained between the majority of the surface area of the workpiece 18 and the second wall 22. In other embodiments, the workpiece may be shaped such that substantially all of the second wall is in contact with the workpiece 18. That is to say, the workpiece is not provided with a shoulder 40, and the channel 14 is shaped to conform a significantly larger area of the workpiece than shown in the examples of FIGS. 1 to 4.

The invention has been described with reference to the mounting of an annular component, such as a casing for a gas turbine engine, where the diaphragm 24 and clamping means 50 are provided on the radially outer wall (ie the first wall 20) of the channel 14. In other embodiments (not shown) the diaphragm 24 may be provided on the radially inner wall (ie second wall 22) of the channel 14, and is operable to bias the workpiece towards, and locate it on, the first wall 20. Likewise the clamping means 50 may also be provided on the radially inner wall 22, configured to make contact with the workpiece 18 and clamp it to the fixture base 12 in some appropriate manner.

The channel 14 is shaped to the desired machining shape of the workpiece. While in the examples described above the channel is annular, the present invention may also be configured to support non circular workpieces. For example, the channel may be oval (for oval workpieces), arcuate (for arcuate workpieces) or substantially straight (for substantially straight workpieces).

The invention claimed is:

1. A fixture for supporting a workpiece during a machining operation, the fixture comprising:
   a base provided with a channel for receiving part of the workpiece, the channel having a first wall facing an opposing second wall, wherein
   an inflatable diaphragm is located on the first wall, and configured to engage with an engagement surface on the workpiece and bias the workpiece against the second wall, and the diaphragm includes a deformable portion spaced apart from the first wall of the channel, the deformable portion having ends which provide a seal with the first wall to define a chamber enclosed by the first wall and the diaphragm, wherein the deformable portion is manufactured from a high elasticity metal.

2. A fixture as claimed in claim 1 wherein the ends of the diaphragm are substantially thicker than the deformable portion.

3. A fixture as claimed in claim 1 wherein a sealing member is provided between at least one of the ends of the diaphragm and the first wall.

4. A fixture as claimed in claim 1, wherein the channel is configured to support the workpiece such that substantially the centre of the deformable portion is aligned with the engagement surface of the workpiece.

5. A fixture as claimed in claim 4 wherein the diaphragm is seated in a groove provided in the base of the channel.

6. A fixture as claimed in claim 1, wherein means are provided to trap the diaphragm in the channel.

7. A fixture as claimed in claim 1 wherein the channel is substantially annular.

8. A fixture as claimed in claim 1 wherein the fixture further comprises a clamping means for clamping the workpiece to the fixture.

9. A fixture as claimed in claim 1 wherein a supply passage is provided in the first wall for delivery of fluid to the chamber from a fluid source.

10. A fixture as claimed in claim 9 wherein the supply passage is coupled to a source of pressurised fluid/gas.

11. A fixture as claimed in claim 9 wherein the supply passage is coupled to a valve for evacuation of fluid from the chamber.

12. A method of locating a workpiece for a machining operation, comprising the steps of:
   a) entering a region of the workpiece in a channel provided in a support base, the channel having a first wall facing an opposing second wall;
   b) inflating a diaphragm located on one wall of the channel such that the workpiece is biased against the opposing channel wall;
   c) clamping the workpiece to a fixture with a clamping means; and
   d) deflating the diaphragm prior to commencing a machining operation;
      wherein the diaphragm includes a deformable portion spaced apart from the first wall of the channel, the deformable portion having ends which provide a seal with the first wall to define a chamber enclosed by the first wall and the diaphragm.

\* \* \* \* \*